E. B. GREEN, JR

WARDROBE

Dec. 1, 1931.

Re. 18,267

Original Filed May 6, 1929

INVENTOR

Edward B. Green Jr.

BY

ATTORNEY

Reissued Dec. 1, 1931

Re. 18,267

UNITED STATES PATENT OFFICE

EDWARD B. GREEN, JR., OF BUFFALO, NEW YORK, ASSIGNOR TO MODERN WARDROBE, INC., A CORPORATION OF NEW YORK

WARDROBE

Original No. 1,734,768, dated November 5, 1929, Serial No. 360,638, filed May 6, 1929. Application for reissue filed August 12, 1930. Serial No. 474,811.

The present invention relates to wardrobes or clothes closets, and is aimed to provide a simple construction whereby a highly efficient use is made of available space and the doors of the wardrobe will be pushed partly back into the wardrobe when they are open.

The essential feature of my invention is that I supply a pivot removed back a substantial distance from the plane of the door in such a manner as to support the weight of the door, and connect the door to this pivot at least in part by a bar on which ordinary clothes hangers can be hung. I have found that the cheapest way to arrange this pivot is to supply a member inside the wardrobe running from the top to the bottom thereof to which the door is connected, but if preferred I may use two separate pivot members one at the top and one at the bottom.

Figure 1:
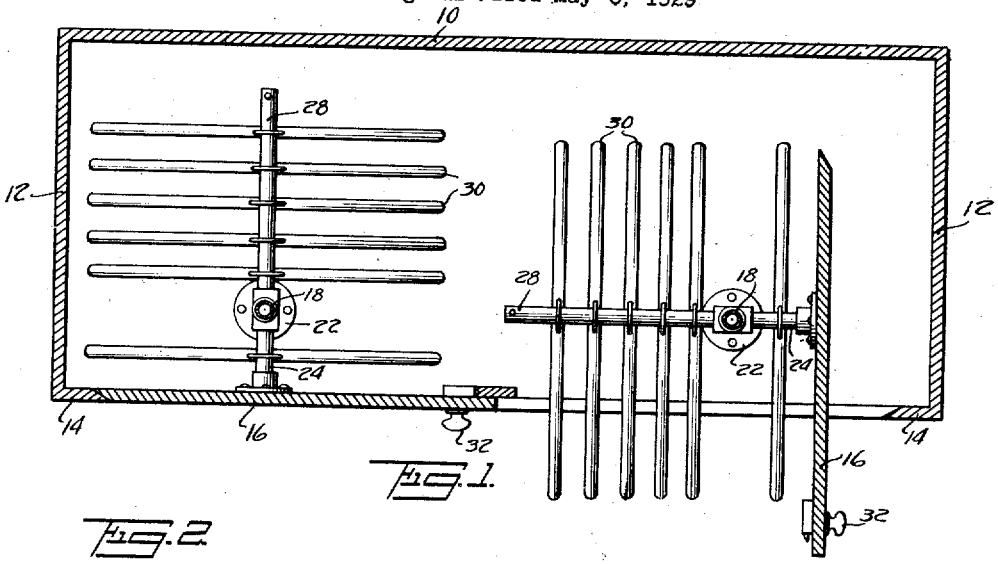
Figure 2:
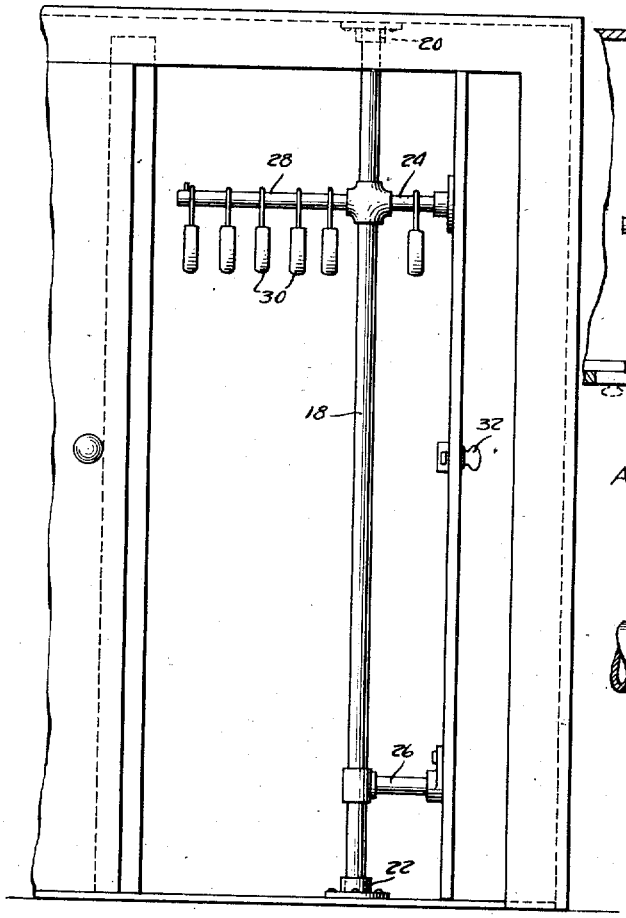
Figure 3:
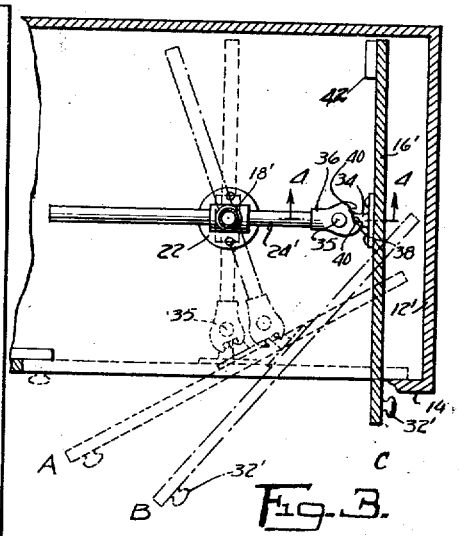
Figure 4:
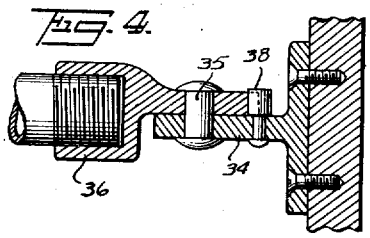

My invention can readily be understood by reference to the illustrative examples shown in the accompanying drawings, in which Fig. 1 is a sectional view through a wardrobe embodying my invention; Fig. 2 is a front view of a portion of such wardrobe; Fig. 3 is a sectional plan view corresponding to Fig. 1 showing a slight modification, and Fig. 4 is a sectional view on line 4—4 of Fig. 3 showing details of the hinge construction used in Fig. 3.

The wardrobe (which may either be built in the wall or made as a complete unit) is here shown as comprising a back member 10, two side members 12 and two members 14 which extend a short distance across the face. The doors 16 meet in the middle and are bevelled near their outer edges to match up with the members 14. The pivots about which the doors move are positioned well back of the plane of the doors and in this example each is shown as being slightly to the side of the center of its door. In the present instance such pivots are made up of a pipe 18, mounted in the top and bottom bearings 20 and 22, in which the pipe 18 pivots. A bar 24 connects the upper part of the central portion of the door with the pivot 18, and a similar lower bar 26 connects the lower part of the door with the pivot. An additional bar 28 is supplied which is substantially a continuation of the bar 24. These bars may be formed of ordinary pieces of pipe and the entire device, except the pivots 20 and 22, can be assembled from usual pipe fittings. The coat hangers, as 30, may be hung from the bars 24 and 28, which may be considered as forming jointly an upper door support bar.

With this construction, the doors may be made no wider than the coat hangers and the parts may be so proportioned that the ends of the coat hangers will extend across in back of the front portions 14 of the enclosure so that all of the space in the enclosure will be used efficiently. The doors are preferably supplied with knobs as indicated at 32 by which they can be opened.

When the doors are shut, a pull on a knob 32 will start the door 16 pivoting around the pipe 18. This means that, as the front edge of the door comes forward, the outer edge will move back into the wardrobe. At the same time, the bar 28 will swing with the door and the clothes will be swung around into such position that they are readily accessible from the front of the wardrobe and actually extend out of the wardrobe. The device operates very easily, for the weight of the clothes is not carried by the door but is carried on the metal pivot and as the bars 24 and 28 are rigidly connected together, the weight of the clothes on the bar 28 is balanced by the weight of the door to keep the thrust more or less directly on the bottom bearing.

It is to be noted that in the structure shown in these figures, when the door is closed, each pivot 18 is in back of the central part of its door but, more specifically, is perpendicularly back of a vertical line on the door which is nearer the edge which swings inwardly (that is the edge which contacts with member 14) than it is to the edge which swings outwardly. It is further to be noted that the distance which the center of pivot 18 is back of the front face of its door is more than half the distance from the said vertical line on the door opposite the pivot, to the inwardly swinging edge, but does not exceed this total distance. This is essential to insure each door swinging over adjacent to member 14 when it is open, but if the pivot is simply positioned in accordance with this rule, it may be brought over so near to the inwardly swinging edge that only a small part of the door will be in the cupboard when the door is open, whereas, it is highly desirable that less than half of the door shall stick out. As is apparent from examining the right hand side of Fig. 1, the proportion of the door which is back in the cupboard when the door is open is equal to the sum of the distance from the front of the door to the center of the pivot, plus the distance from the said vertical line perpendicular to the pivot to the inwardly swinging edge. If this sum is more than half the width of the door, then when the door is open in a perpendicular position, more than half of the door will be enclosed in the cupboard. Within these rules, the position of the pivot may be varied, but these rules must be followed if one is to get a structure as shown, in which the doors when open project out only a small part of their width and are over close to the sides of the enclosure.

In the modification shown in Fig. 3 the front panel 14′ is made narrower than the corresponding panel 14 of Fig. 1 and the outer edge of the door 16′ is much closer to the end 12′ of the enclosure. In order that the door 16′ may clear the side of the enclosure, an additional pivot is provided between the bar 24′ and the door. This pivot comprises a member 34 attached to the door and connected by a pivot pin 35 to a member 36 attached to the bar 24′. Member 34 is provided with a pin 38 which cooperates with stops 40 on the member 36 to limit the relative amount of movement of the two members 34 and 36.

In Fig. 3 the door 16′ is shown as open and is shown in closed position and in two intermediate positions in broken lines. If the door is closed and one pulls on a knob 32′ the door will first swing into position "A" flexing about pin 35. A further pull on the knob 32′ will cause the main pivot 18′ to rotate, and the door and upper support bar will move into position "B" where the outer edge of the door just clears the side 12′ of the enclosure. On further pivoting about the main pivot 18′ the edge of the door which is swung back into the cabinet will strike the stop 42 (arranged on either the top or bottom of the cabinet) and will swing into position "C" or the open position shown in full lines. While this form is slightly more expensive to produce than that shown in Figs. 1 and 2, it may be useful where the space available is of a shape that does not readily lend itself to the other form of structure.

It is to be understood that the examples are given only by way of illustration and may be modified in many particulars without departing from the spirit of my invention.

I claim:

1. In an enclosure adapted for use as a wardrobe or the like, a substantially flat door, a vertical pivot bar inside the plane of the door held against substantial lateral movement, support arms connecting the door with said pivot bar whereby the door is supported by the pivot bar, and a clothes support bar connected with the pivot bar and extending from the pivot bar in a direction away from the door and adapted to move with said support arms.

2. A structure as specified in claim 1, in which the door is connected to the support arms by a hinged joint permitting relative movement of the door and support arms.

3. In an enclosure adapted for use as a wardrobe or the like, a door therefor, arms extending back from the central portion of the door adapted to support the door, means for supporting such arms to pivot about a line a substantial distance inside the plane of the door, and an extension for the upper of said arms which moves with such upper arm and is adapted to serve as a support for clothes or the like.

4. An enclosure of the type described, comprising a fixed front portion at one side of the doorway, a substantially flat door having an inwardly swinging edge adapted to contact with said front portion when the door is closed and an outwardly swinging edge, a pivot for said door perpendicularly back of a vertical line on the door when closed, nearer said inwardly swinging edge than said outwardly swinging edge, the center of said pivot being back of the front face of the door a distance more than half as great but not greater than the distance from said vertical line on the door to the inwardly swinging edge, and the sum of said distance from the center of the pivot to the front face plus the distance from said vertical line on the door to the inwardly swinging edge being greater than half the width of the door, means fixed immovably on the door for mounting the the door on said pivot so that when the door is opened to a position perpendicular to its closed position, it will be adjacent said fixed front portion of the enclosure with more than half of its width in the enclosure, and support means, positioned behind said door and fixed relative to the door so that the same will swing around said pivot when the door is opened.

EDWARD B. GREEN, Jr.